F. P. MILLER.
CUTTER HEAD.
APPLICATION FILED DEC. 26, 1918.

1,342,055.

Patented June 1, 1920.

WITNESSES
Edw. Thorpe
Theo. G. Hooker

INVENTOR
Frank P. Miller
BY Munn & Co.
ATTORNEYS

UNITED STATES PATENT OFFICE.

FRANK P. MILLER, OF MEADVILLE, PENNSYLVANIA.

CUTTER-HEAD.

1,342,055.　　　　　Specification of Letters Patent.　　Patented June 1, 1920.

Application filed December 26, 1918. Serial No. 268,345.

*To all whom it may concern:*

Be it known that I, FRANK P. MILLER, a citizen of the United States, and a resident of Meadville, in the county of Crawford and State of Pennsylvania, have invented new and useful Improvements in Cutter-Heads, of which the following is a full, clear, and exact description.

The invention relates to cutter heads such as are used in milling machines and other tools, and its object is to provide certain new and useful improvements in cutter heads whereby the cutting tool is firmly drawn into position in its seat and is securely fastened therein without the use of set screws or similar fastening devices. Another object is to permit of quickly fastening the cutting tool in place or to allow of removing it therefrom whenever it is desired to do so.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in both views.

Figure 1:
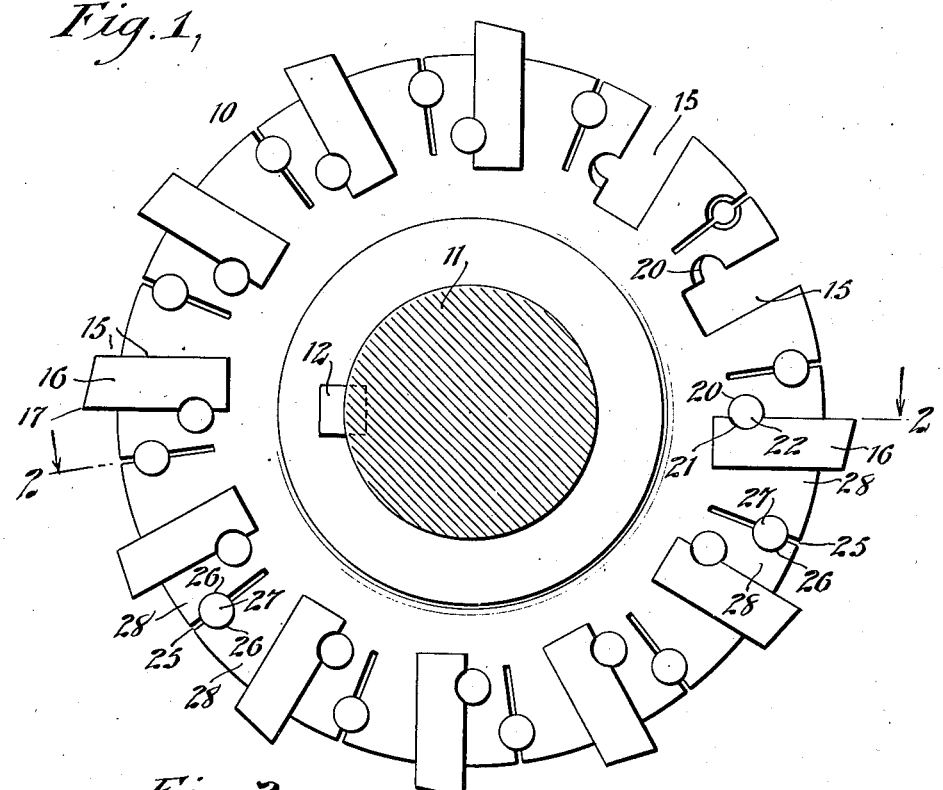
Figure 2:
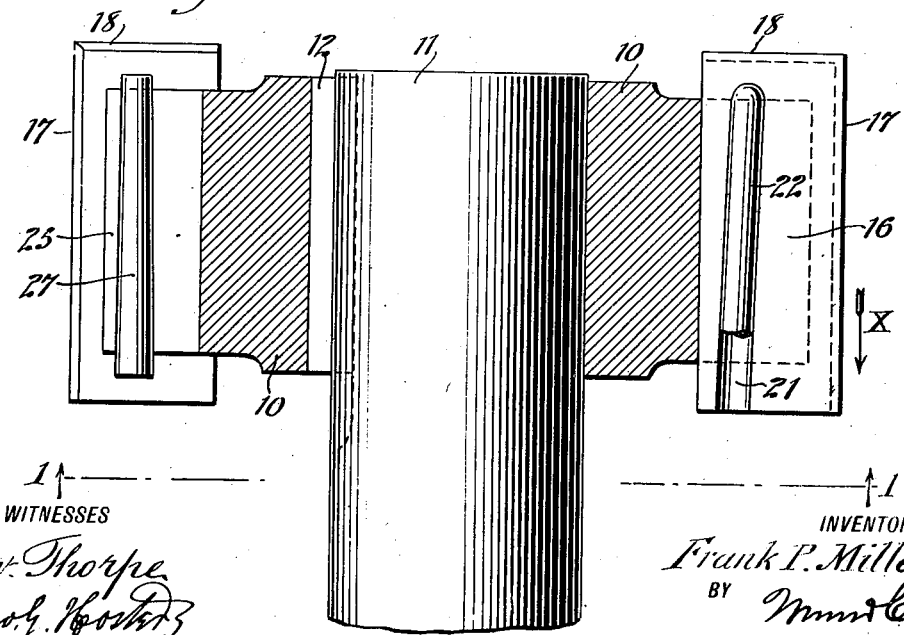

Figure 1 is a face view of the cutter head with sundry of the cutting tools removed and with the spindle shown in section on the line 1—1 of Fig. 2; and Fig. 2 is a sectional plan view of the same on the line 2—2 of Fig. 1.

The cylindrical body 10 of the cutter head is fastened to the spindle 11 by a key 12 or other suitable means, and in the peripheral face of the body 10 are formed seats or slots 15 spaced apart and each adapted to receive a cutting tool 16. Each cutting tool 16 is provided with an outer cutting edge 17 and with a cutting edge 18 at one end, as plainly indicated in Fig. 2. It is understood that the cutting edges 17 are used in the usual manner while the cutting edges 18 are used for face or end milling.

One wall of each seat 15 is provided with a groove 20 preferably made half round in cross section. A similar groove 21 is formed in the side wall of the corresponding cutter 16 and is adapted to register with the groove 20 at the time the cutter is placed in position in the seat 15. A pin 22 is driven into the registering grooves 20 and 21 to draw the cutter 16 firmly to its seat and securely to fasten the cutter in position in the seat. The grooves 20 and 21 are preferably inclined relative to the axis of the cutter head, as plainly indicated to the right in Fig. 2, and the groove 21 extends from the non-sharpened end of the cutter 16 to within a short distance of the other end having the cutting edge 18 thus leaving this cutting edge 18 unobstructed for cutting purposes. It will be noticed that by this arrangement it is easier to tighten the pin 22 against the bottom of the groove 21 and thereby force the cutter 16 down into its seat 15. It will also be noticed that by having the registering grooves 20 and 21 inclined as shown and described, it is evident that when using the cutting edge 18 the strain of the cut naturally tends to force the cutter in the direction of the arrow $x$ indicated in Fig. 2, thus moving the cutter against a positive stop formed by the pin 22, and hence frictional contact alone is not depended upon to prevent the cutter from endwise movement.

Additional means are provided for securely holding the cutting tools 16 in position in their seats and for this purpose the following arrangement is made: Slits 25 are formed in the body 10 intermediate adjacent seats 15, the slits extending from the peripheral face radially inward to approximately the depth of the grooves 20. The walls of each slit 25 are provided with half round registering grooves 26 extending transversely from one face of the body 10 to the other face thereof (see left-hand side of Fig. 2) and the grooves are preferably made tapering and in the registering grooves is driven a tapering pin 27. It will be noticed that by the use of the slits 25 clamping members 28 are formed on the outer portion of the body 10 and when the tapering pin 27 is driven into the registering grooves 26 then the clamping members 28 are spread apart and in doing so firmly clamp the adjacent cutting tools in position in their seats 15. From the foregoing it will be seen that by the arrangement described the cutting tools are firmly drawn into position in their seats and securely clamped therein.

The pins 22 and their grooves 20 and 21 may be either straight or tapering and the grooves 20 and 21 may be parallel with the bottom of the corresponding seat 15 or at an angle, as shown in Fig. 2.

Having thus described my invention, I claim as new and desire to secure by Letters Patent:—

1. A cutter head, comprising a body provided on its peripheral face with transversely extending seats, cutters fitting the said seats, each seat and its cutter being provided on the contacting walls at one side with registering grooves, the said grooves being inclined radially outwardly relative to the axis of the cutter head, and a pin inserted in a pair of registering grooves to draw the cutter firmly inward into final position in its seat and to hold the cutter in this final position.

2. A cutter head, comprising a body provided on its peripheral face with transversely extending seats, cutters fitting the said seats, each cutter having an outer cutting edge parallel to the axis of the cutter head and a cutting edge at one end, each seat and its cutter being provided on the contacting walls at one side with registering grooves, the groove in the wall of the seat extending from one face of the body to the other face thereof, and the groove in the side wall of the cutter extending at a distance from the end cutting edge to the other end of the cutter, the said registering grooves being inclined radially outwardly relative to the axis of the cutter head, and a pin adapted to be driven into the registering groove at each cutter.

FRANK P. MILLER.